INVENTOR.
GERALD H. YOUNG
BY
Kenyon & Kenyon
ATTORNEYS

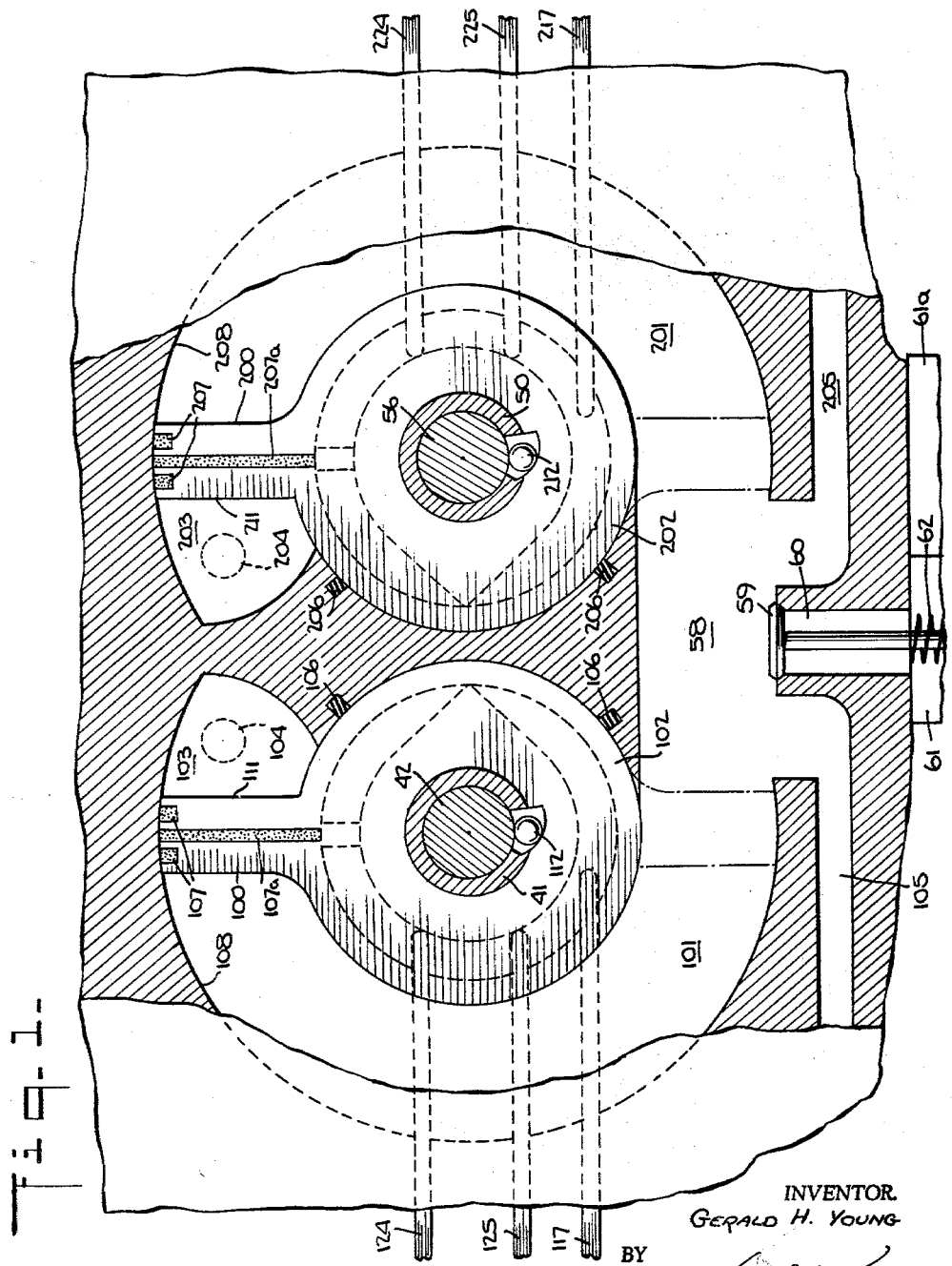

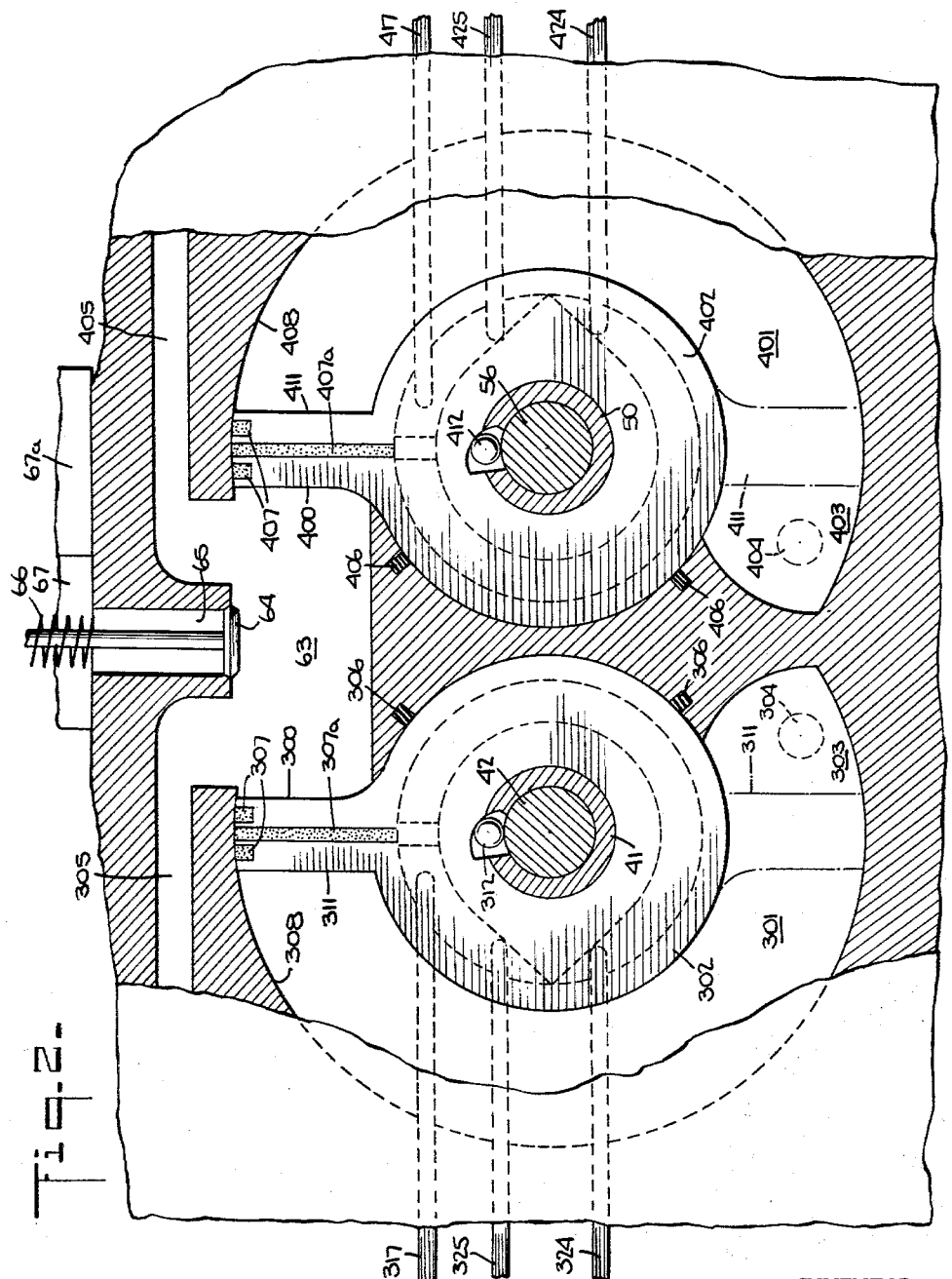

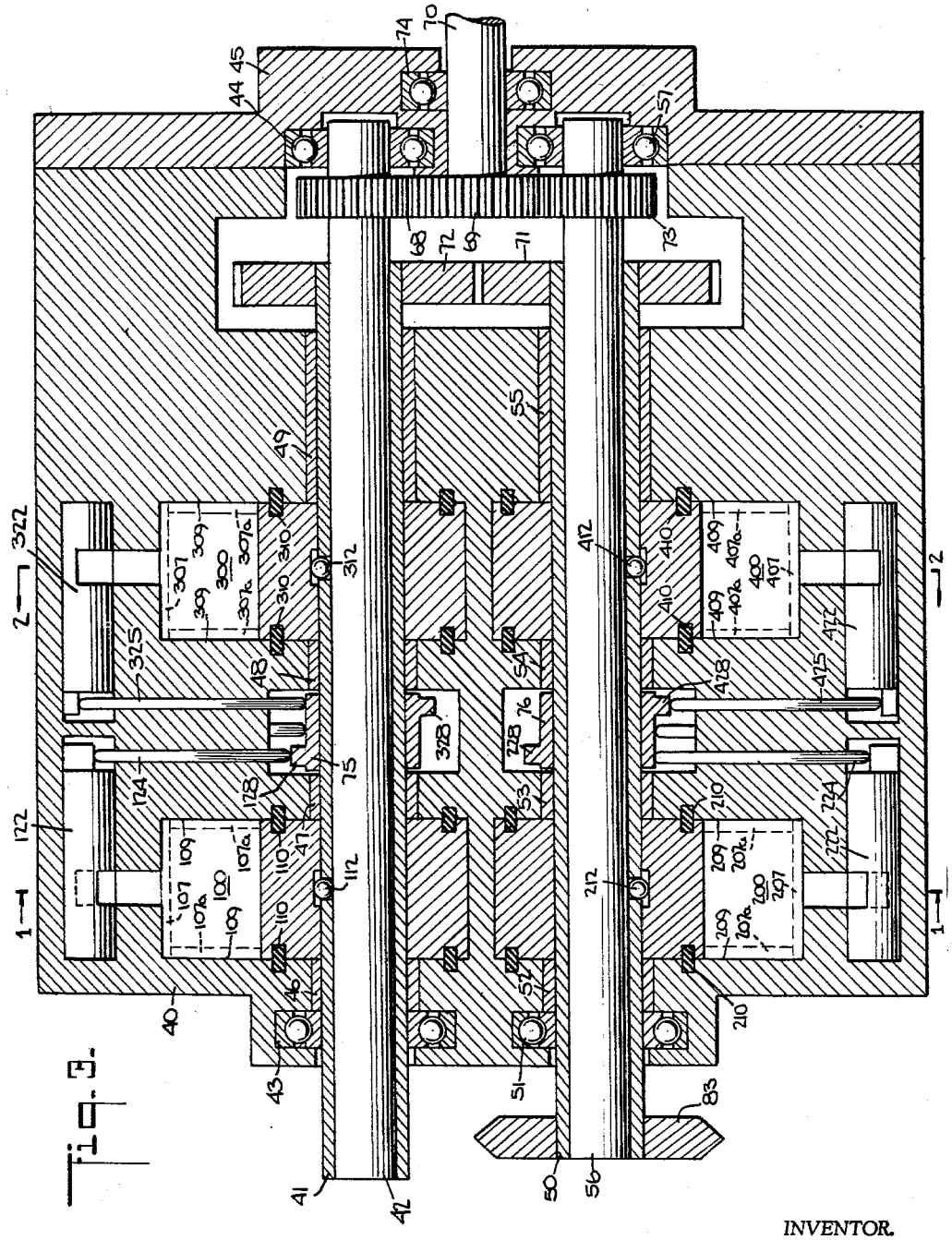

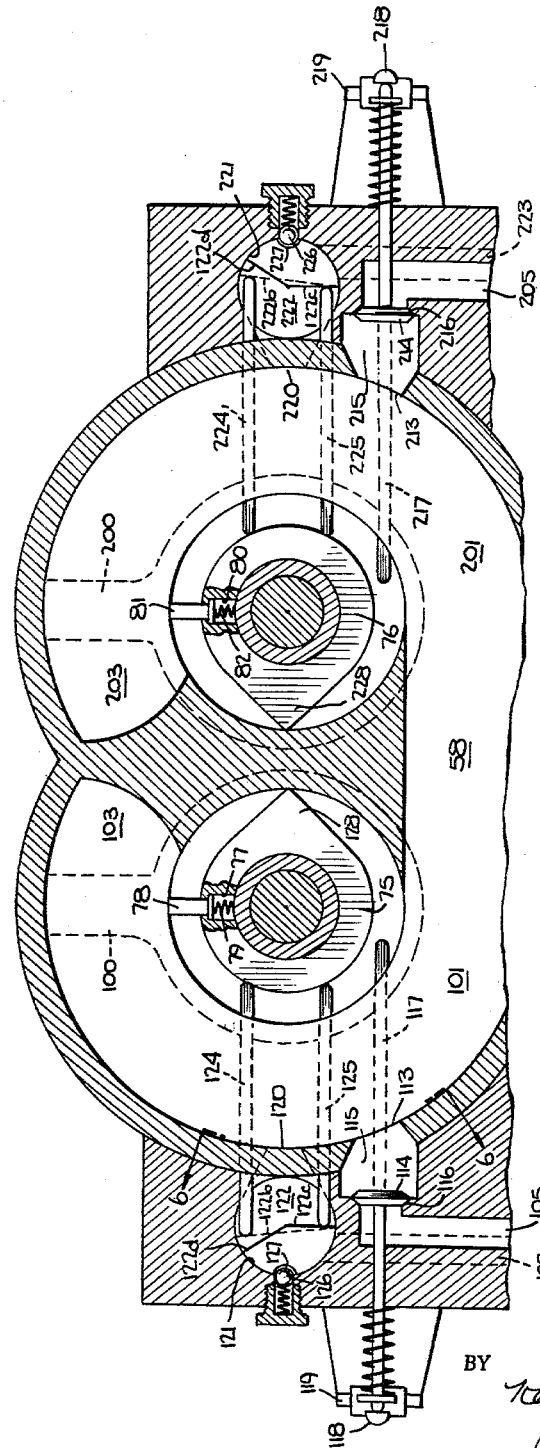

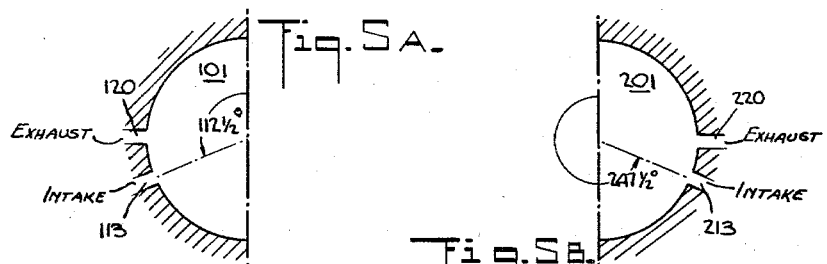
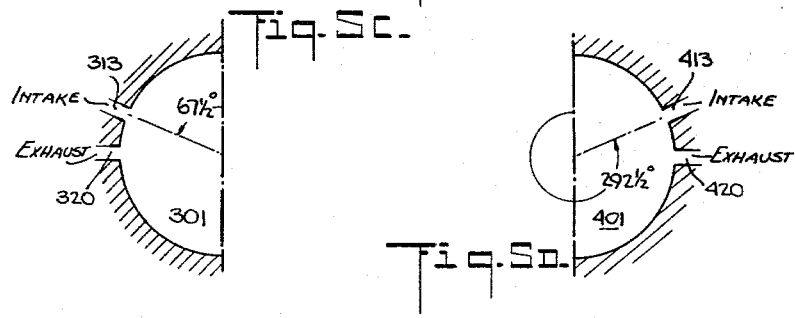
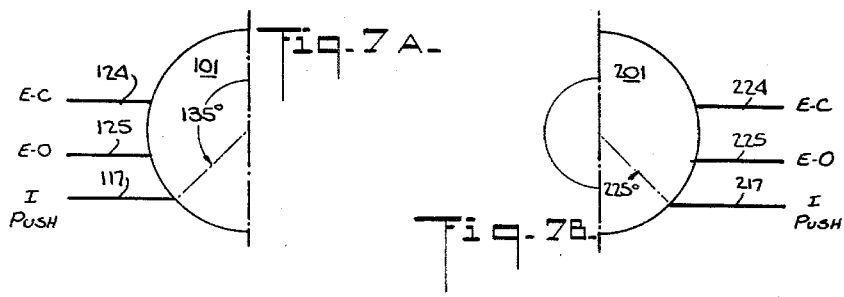
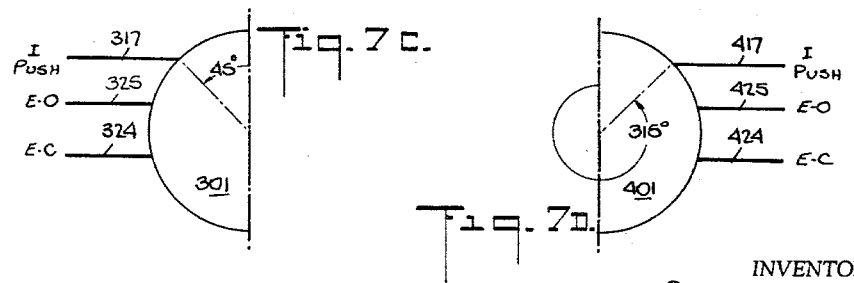

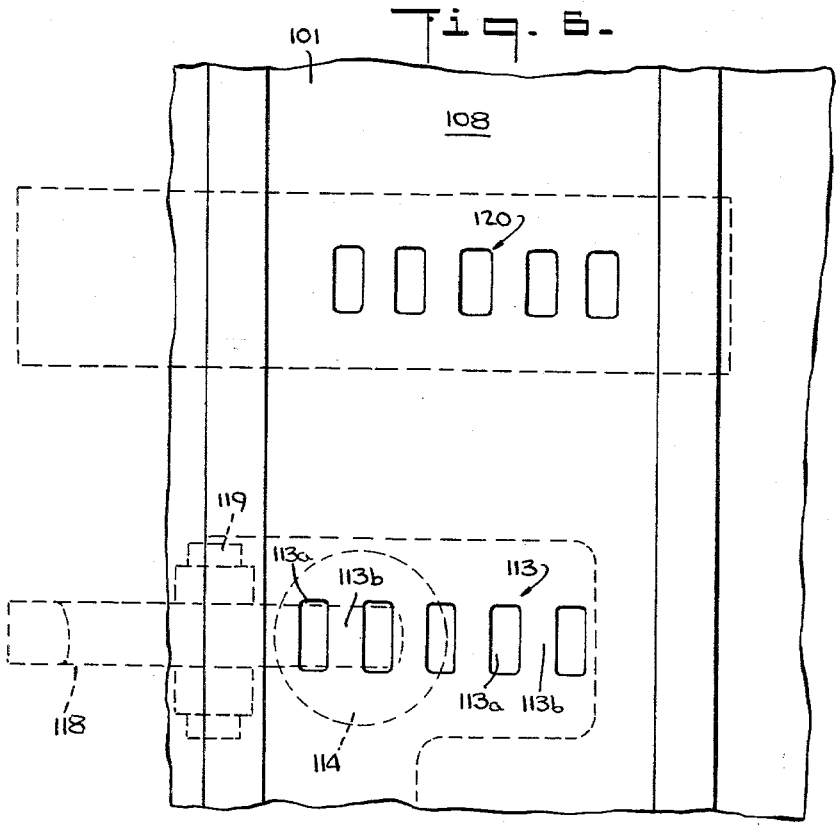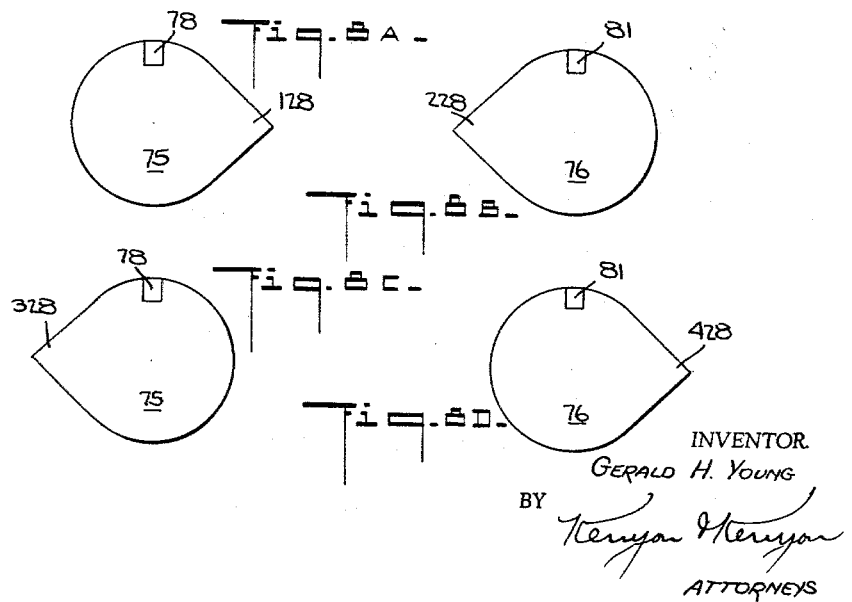

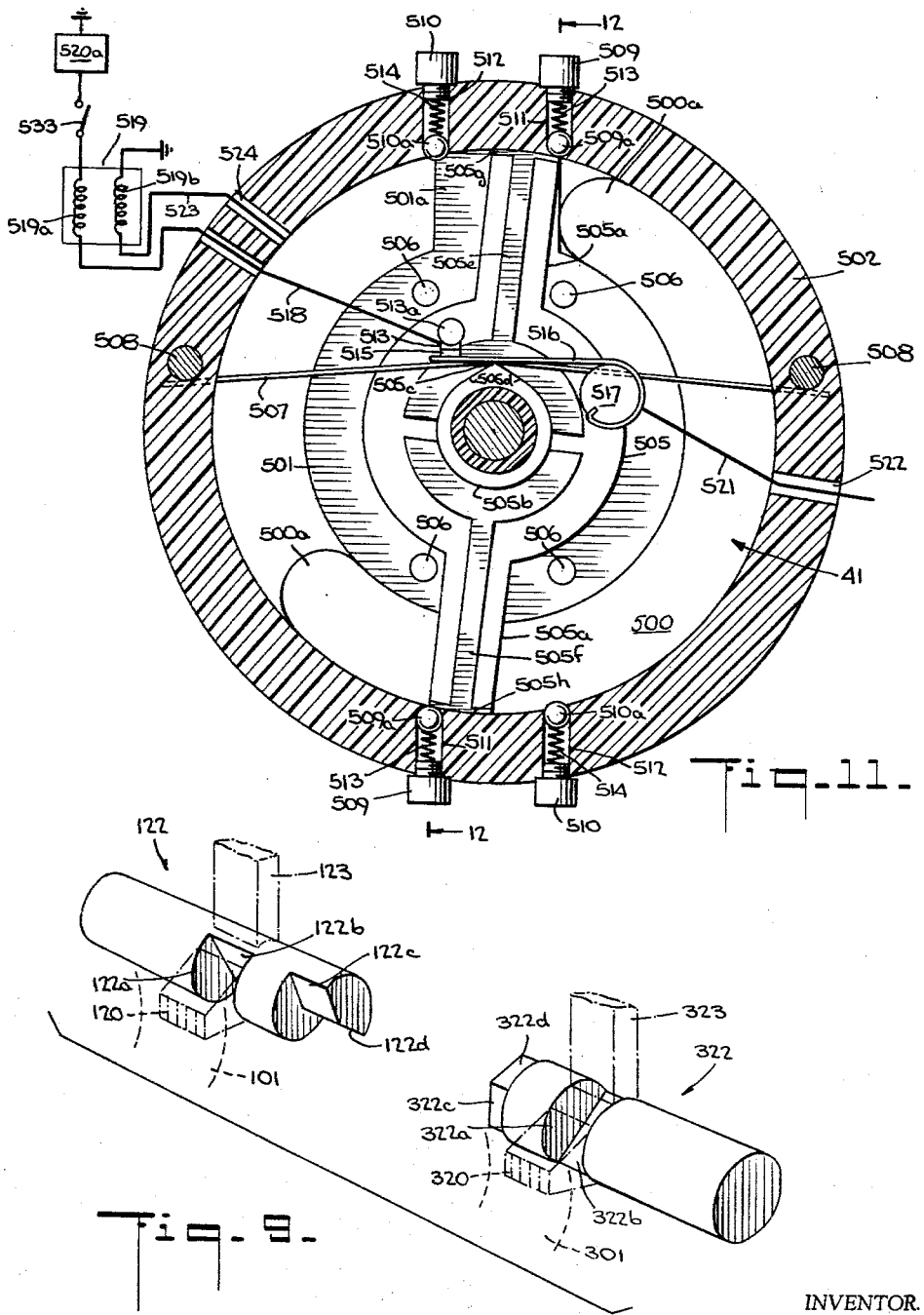

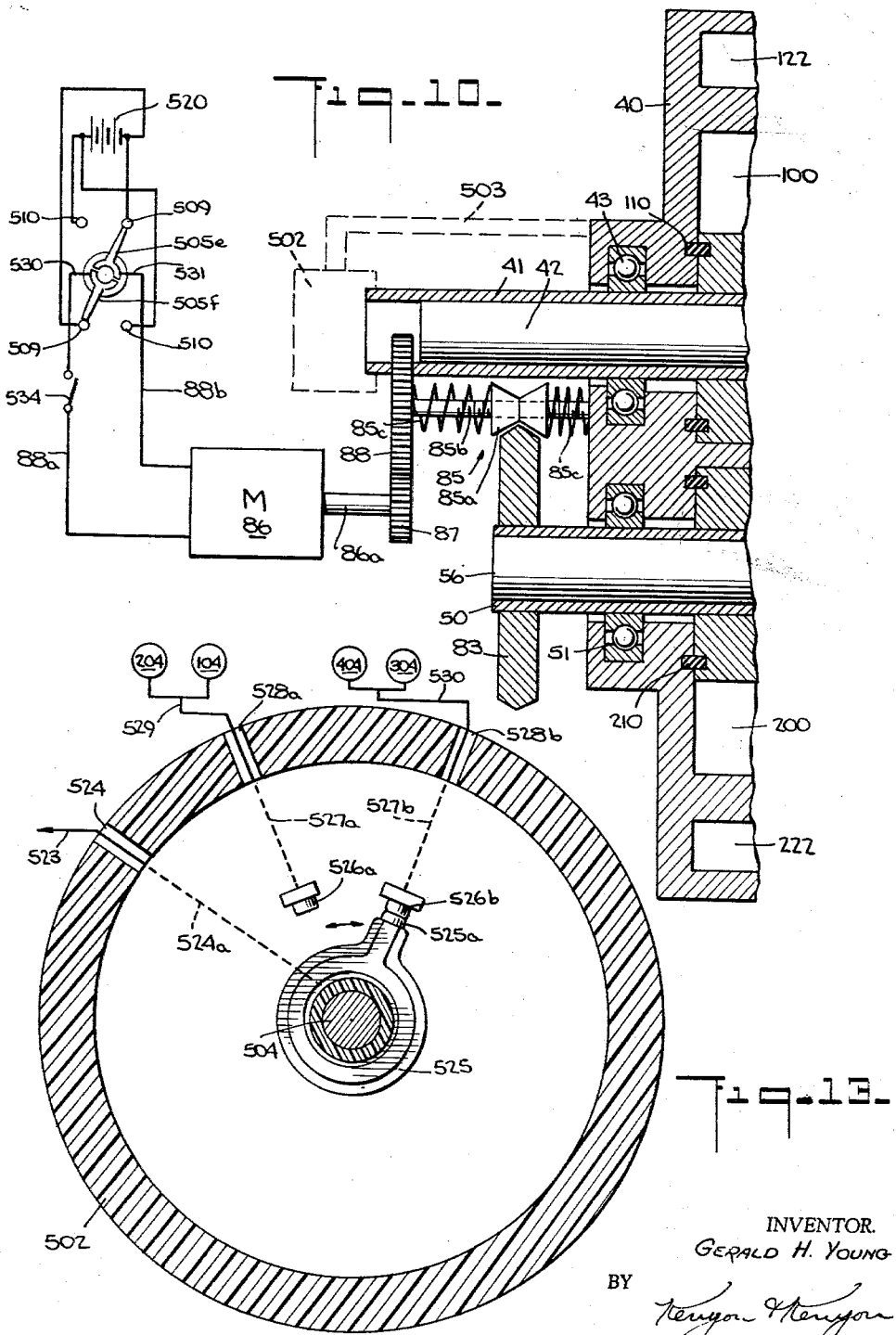

3,181,513
OSCILLATING ENGINE
Gerald H. Young, 12 Lorraine Road, Summit, N.J.
Filed Aug. 23, 1962, Ser. No. 218,962
19 Claims. (Cl. 123—18)

This invention relates to an internal combustion engine and more particularly it is concerned with an engine which operates with an oscillating motion.

Internal combustion engines in which compression, ignition, and expansion of a combustible mixture occurs in a chamber within the engine in accordance with a thermodynamic cycle such as the Otto or diesel cycle generally employ a cylinder with a closed end portion to form a chamber in which a piston reciprocates. In order to transmit the movement of the piston which is driven by the expanding gas accompanying combustion, a slider crank linkage in the form of a crank shaft and connecting rod is normally employed since this arrangement can convert the reciprocating motion of the piston into rotational motion. The form of the cylinder in conjunction with the form of the connecting rod and crankshaft generally results in an engine having a substantially elongated shape. Such a shape for an engine is undesirable where the available space at the point of installation makes a compact device necessary.

Due to the appreciable distance between the piston and the center of rotation of the crankshaft, the mass of the reciprocating connecting rod and piston, and the speed of operation, reciprocating engines inherently are subjected to high inertia forces, especially when they are operated at high operating speeds. The high inertia forces in turn require great strength in the reciprocating parts and careful design of the bearings for the crankshaft, the connecting rod and the wrist pin located between the connecting rod and piston in order to withstand the loads. In addition, the inertia forces result in undesirable shaking forces which are transmitted to the supporting structure. The reciprocating engine also imposes critical lubrication requirements upon the designer since oil must be delivered to the bearing between the crankshaft and the connecting rod as well as the bearing at the wrist pin.

In the commoner form of internal combustion engine, the four stroke cycle is employed. By definition, this cycle is limited to a single power stroke during four strokes or two revolutions of the engine. Thus the power output in relation to the displacement of the engine is limited. On the other hand many reciprocating internal combustion engines operate with a two stroke cycle. In these engines supercharger units can be used to deliver the air to the cylinder prior to compression and also to assist the scavenging of exhaust gas from the cylinder. Where cost or size does not justify the use of a supercharger, the underside of the piston opposite to the side subjected to the forces of combustion is used to compress air in the engine crankcase for charging the cylinder. With this arrangement, it is not convenient and in many times not possible to provide a continuous lubricating system for the bearings since the lubricating oil would be carried away by the fuel air mixture being compressed. Thus this type of engine requires that the lubricant be mixed with the fuel in order that the lubricant can contact the bearings during the compression process underneath the piston.

The most common way to increase the output of an engine while obtaining a more constant level of torque is to provide a plurality of cylinders connected to a common output shaft. Here again the elongated nature of the cylinder and piston arrangement prevents the obtaining of a compact design. Thus the engine must assume a form which extends substantially in one plane or in several intersecting planes. For example, the cylinders may be arranged in a row, in opposed rows, in V-form, in X-form or in a radial arrangement. In none of these arrangements can the cylinders be positioned into a truly compact form such as a cube or a short cylindrical shape.

Therefore it is one of the objects of the invention to provide a fluid device operating with an oscillating motion.

It is another object of the invention to provide a fluid device having an oscillating motion which is converted to rotary motion.

It is still another object of the invention to provide an internal combustion engine which operates with an oscillating motion.

It is a further object of the invention to provide an internal combustion engine in which a plurality of units each operating with an oscillating motion are coupled together to provide a single output.

It is an additional object of the invention to provide a fluid device operating with an oscillating motion which is adaptable to serve as a fluid compressor, a fluid pump, and a fluid motor.

In one embodiment of the invention, the fluid device is an internal combustion engine which comprises an arcuate chamber in which a vaned rotor is mounted to move in an oscillating manner. Means are provided for controlling the flow of fluid into and out of the chamber in a timed relationship with the oscillating motion of the rotor. Thus it is seen that the device, when provided with a pressured or expansible fluid can convert the energy of the fluid into oscillating motion.

The arcuate chamber and vaned rotor arrangement provide a compact structure which has members of limited dimensions extending from the center of oscillation and consequently lower inertia forces. With the vaned rotor construction, the bearing requirements are greatly simplified as well as the provision of adequate lubrication. In addition the vaned rotor arrangement is conveniently adapted to the two stroke cycle since the underside portion of the vaned rotor can serve as an efficient compressor or supercharger. The chamber and vaned rotor assembly is also well suited to being arranged in pairs and the pairs of the chambers can be further arranged in banks. Thus a plurality of chambers and rotors can be brought together into a compact package giving high power output.

In another embodiment of the invention the fluid device is provided with means for coupling the oscillating motion to a rotating member.

In still another embodiment of the invention, the fluid device comprises a plurality of chambers having oscillating vaned rotors therein. The device further includes means for commonly connecting the oscillating rotors to a single rotating shaft member.

In a further embodiment of the invention, the fluid device is an internal combustion engine having an arcuate chamber, a vaned rotor mounted for oscillating motion therein, a shaft for rotating in a constant direction, means for coupling the oscillating rotor to the rotating shaft, and means for controlling the flow of fluid into and out of the chamber in timed relationship with the oscillation of the rotor.

In still a further embodiment of the invention, the chambers and rotors are arranged in adjacent pairs having substantially parallel axes of oscillation and in turn the pairs are arranged in connected banks thereby forming a complete engine.

Other objects and advantages will become apparent from the following description taken in conjunction with the accompanying drawings in which:

FIG. 1 is a vertical section view showing a pair of chambers containing vaned rotors which move downwardly during combustion;

FIG. 2 is a vertical section view showing another pair of chambers containing vaned rotors which move upwardly during combustion;

FIG. 3 is a horizontal section view of the engine showing the positioning of the two banks of chambers and rotors as well as the drive for converting oscillating motion into rotational motion in a constant direction;

FIG. 4 is a vertical section view of the engine showing the intake and exhaust valve arrangement for a pair of chambers;

Figure 12:
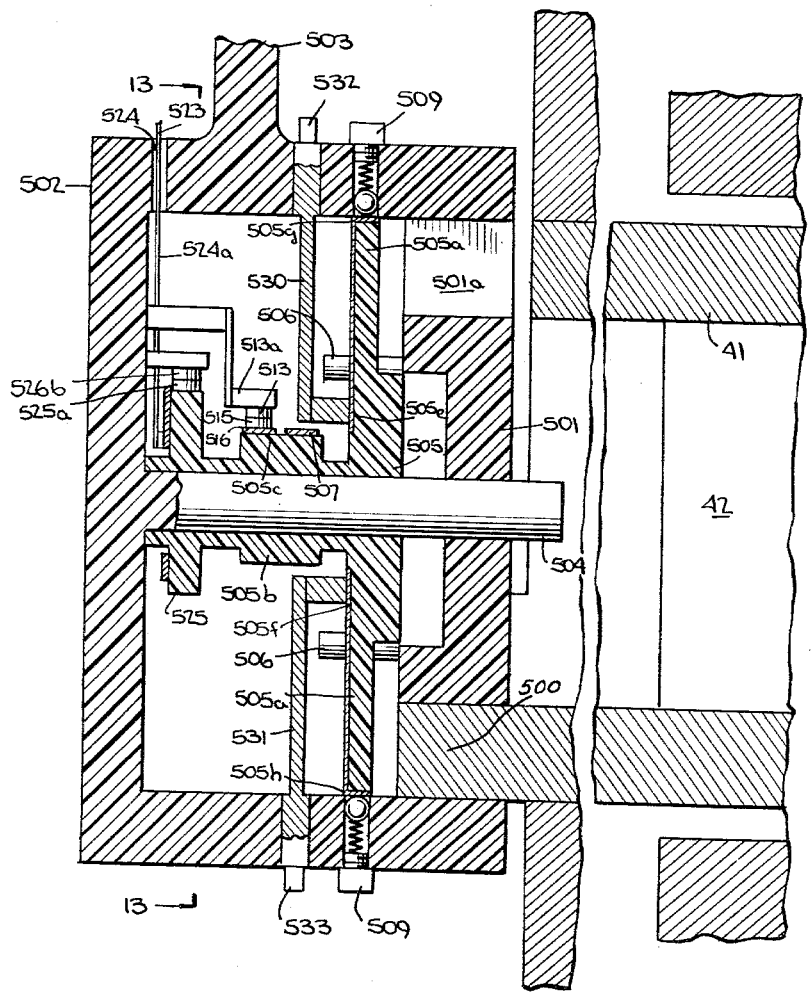

FIGS. 5A–D are schematic representations of the chambers showing the angular position of the intake and exhaust ports;

FIG. 6 is a vertical section view taken along the line 6—6 in FIG. 4 and showing the intake and exhaust ports disposed within the arcuate wall of the chamber;

FIGS. 7A–D are schematic representations of the angular location of the push rods adjacent each chamber for opening and closing the exhaust valves as well as that of the push rod for opening and closing each of the intake valves;

FIGS. 8A–D are schematic representations of the cam unit of the engine showing the location of the exhaust valve cams the intake valve cam pins at one condition of the engine cycle for each of the chambers;

FIG. 9 is a perspective view of two of the rotary exhaust valves and the passages related thereto;

FIG. 10 is a schematic representation of the starter drive which is adapted to be engaged to the starter gears of the outer shafts;

FIG. 11 is a vertical section view showing the arrangement for timing the operation of the starter switch and also of the ignition;

FIG. 12 is a vertical section view taken along the line 12—12 in FIG. 11 and showing the starting and ignition arrangement as well as the means for actuating it.

FIG. 13 is an elevational section view taken along the line 13—13 in FIG. 12 and showing the distributor arrangement of the ignition system.

In one embodiment, the fluid device includes an oscillating engine comprising two banks of chambers adjacent to one another and each containing a vaned rotor. In describing the invention in the embodiment of an internal combustion engine, the elements related to each of the four rotors are assigned reference numerals beginning with 100, 200, 300 and 400, respectively. Thus as shown in FIG. 1, one bank of the engine includes rotors 100 and 200 disposed in circular chambers 101 and 201, respectively. The other bank includes rotors 300 and 400 disposed in circular chambers 301 and 401, respectively. As shown in FIG. 3 the two banks are disposed within block 40 adjacent to one another.

Rotors 100 and 300 include hollow hub portions 102 and 302 which are attached at their inside diameter to hollow outer shaft 41. Outer shaft 41 is journalled on inner shaft 42 with a bearing clearance in order that the shafts may be lubricated and rotate with respect to one another. At one end outer shaft 41 is supported in rotation by ball bearing 43 mounted in block 40 (FIG. 3). Since the inner and outer shafts act as bearings with respect to one another, ball bearing 43 not only supports the outer shaft but the inner shaft as well. At the opposite end of the shafts inner shaft 42 is supported in rotation by ball bearing 44 which is mounted in end cover 45. Outer shaft 41 can be additionally supported with respect to block 40 by bearings 46–49.

The arrangement for the support in rotation of rotors 200 and 400 is similar to that discussed with respect to rotors 100 and 300. Rotors 200 and 400 have hollow hub portions 202 and 402 which are attached to hollow outer shaft 50. Outer shaft 50 is supported in rotation along its outer surface by ball bearing 51 and bearings 52–55 mounted within block 40. Outer shaft 50 is journalled on inner shaft 56 with sufficient clearance for running and lubrication. Ball bearing 57 supports one end of inner shaft 56 in end cover 45.

The rotors are mounted for oscillation within their respective chambers over a path of travel of approximately 180° as shown by the full and dotted line representations (FIGS. 1 and 2). Chambers 101 and 201 contain firing chamber portions 103 and 203, respectively. Ignition devices 104 and 204 which can include spark plugs, glow plugs and the like are disposed in chambers 103 and 203. The lower end portions of chambers 101 and 201 terminate in compression chamber 58 from which extends intake passages 105 and 205. Mixture supply valve 59 is adapted to close passage 60 leading to manifold 61 in which a combustible fuel air mixture is supplied by mixture device 61a such as a carburetor, fuel injector, or the like. Mixture supply valve 59 delivers a charge of the fuel air mixture to compression chamber 58 and then to the chambers when the rotors move upwardly from their extreme downward position and cause a reduced pressure condition in the compression chamber. The reduced pressure or suction developed by the rotors as they move upwardly is sufficient to overcome the downward bias of valve spring 62 so that the valve can open and deliver a charge. The fuel supplied by mixture device 61a can be any type which is suited for an internal combustion engine such as gasoline, kerosene, diesel, oil, L.P.G., etc.

The arrangement of the firing chamber, the compression chamber, the intake passages, etc. are similar in the other banks including rotors 300 and 400 with the exception that their physical position is inverted. Chambers 301 and 401 at their lower portion are provided with firing chambers 303 and 403. Ignition devices 304 and 404 are disposed in firing chambers 303 and 403. Adjacent the top portions of the chambers there is disposed compression chamber 63 from which extends intake passages 305 and 405. Mixture supply valve 64 which is adapted to close passage 65 is biased in an upward direction by valve spring 66. Whenever rotors 300 and 400 move in a downward direction a negative pressure or suction is developed in compression chamber 63 which is sufficient to open valve 64 and thereby admit a charge of fuel and air mixture from manifold 67 which is connected to source means 67a for supplying a combustible mixture of fuel and air as discussed previously.

If the engine is intended to operate with compression ignition as is commonly done in diesel engines, the compression chambers are proportioned to give a sufficiently high compression ratio in order that high pressure high temperature conditions occur after compression. With such an arrangement the mixture supply valves would only admit air and the fuel would be injected into the firing chamber at about the time of maximum compression.

Means are provided to insure that a pressure tight seal is maintained between each of the rotors and its respective chamber. The sealing means comprises sealing strips which are disposed in retaining grooves with the strips being adapted to form a pressure tight seal even though there is relative motion between the strip and the surface with which it is engaged. The grooves in which the strips are disposed can be supplied with pressured oil in order to provide lubrication not only at the strips but to the surrounding portions of the various surfaces between which relative motion takes place.

The outer circumferential surfaces of hubs 102 and 202 are sealed with respect to the block by means of sealing strips 106 and 206 (FIG. 1). Rotors 100 and 200 are provided with end strips 107 and 207 which contact inner circular walls 108 and 208 of chambers 101 and 201. Side walls 109 and 209 of chambers 100 and 200 are provided with circular sealing strips 110 and 210 which are disposed in grooves in the walls and in the adjacent areas of the rotors (FIG. 3). A similar sealing arrangement is employed in the bank containing rotors 300 and 400. Thus hubs 302 and 402 are sealed with respect to the block by sealing strips 306 and 406 (FIG. 2). Rotors 300 and 400 are provided with end strips 307 and 407. Inner circular walls 308 and 408 are sealed by the end strips while side walls 309 and 409 are sealed by circular seal strips 310 and 410. Radial strips 107a, 207a, 307a and 407a seal the respective rotors to the side walls.

The rotors are positioned with respect to their related outer shafts in such a manner that at a given instant each of the rotors is positioned adjacent the top portion of the motor, that is at a zero degree position. Means are provided for maintaining a predetermined relative position between the rotors in each bank as well as a predetermined position between the rotors attached to their respective outer shafts for all points of operation. Thus in operation rotors 100 and 200 move downwardly from the top position shown in FIG. 1 so that at the completion of one oscillation the rotors assume a position substantially 180° away from the starting position, that is, adjacent the bottom portion of the engine. Rotors 300 and 400, which are also at a top or zero degree position when rotors 100 and 200 are at this location, move through an oscillation in the same manner as described. The rotors then return together upwardly from the bottom position to the top position and each of the rotors arrives at the top position in the same instant.

During the power portion of the cycle in chambers 101 and 201, charges ignited in firing chambers 103 and 203 urge the rotors away from one another in a downward direction. Thus the force resulting from the expansion of the burning fuel air mixture acts upon surfaces 111 and 211 of the rotors. The power portion of the cycle of rotors 300 and 400 begins when the rotors are in a downward position at which time ignition of the mixture in firing chambers 303 and 403 results in forces being applied to surfaces 311 and 411. Thus it may be seen when all of the rotors are adjacent the uppermost portion of their travel, rotors 100 and 200 receive a power impulse while on the other hand when the rotors are in their downward position, rotors 300 and 400 receive the power impulses.

When rotors 100 and 200 are at the top position and ignition takes place, the rotors move away from one another in a downward direction. By means of clutches 112 and 312 which can be overrunning clutches of the roller or sprag type, rotor 100 as well as shaft 41 to which it is attached are engaged to inner shaft 42 and cause it to rotate in a counterclockwise direction as viewed in FIG. 1. The torque applied to shaft 42 is transmitted by drive gear 68 to driven gear 69 on output shaft 70. Since clutches 212 and 412 are oriented not to engage during the downward power stroke of rotor 200, torque is not transmitted from rotor 200 directly to shaft 56. Instead rotor 200 drives hollow outer shaft 50 having attached thereto intermediate gear 71 which meshes with intermediate gear 72 attached to outer shaft 41. The torque from rotor 200 after being transmitted by gears 71 and 72 is further transmitted through outer shaft 41 and overrunning clutch 112 to inner shaft 42. In this way the torque resulting from the power impulses of rotors 100 and 200 is transmitted by inner shaft 42 and drive gear 68 to driven gear 69 and output shaft 70.

Since rotors 100 and 300 and rotors 200 and 400 are connected to hollow outer shafts 41 and 50, respectively, the rotors necessarily move together. Thus upon the power impulses at rotors 100 and 200, rotors 300 and 400 are driven thereby into the exhaust portion of their operating cycle and subsequently to the compression portion of their cycle. In this way it can be seen that the torque resulting from the firing at rotor 200 is transmitted through the intermediate gears and is added onto the torque applied to outer shaft 41 by rotor 100. In place of two clutch devices 112 and 312, a single device can be used since these clutches lock in the same direction of rotation.

By means of the coupling effected by the outer shafts, rotors 300 and 400 compress the gas when rotors 100 and 200 are moving through their power stroke. When the rotors have reached the bottom limits of their travel, the ignition system ignites the charges in firing chambers 303 and 403 with the result that rotors 300 and 400 are urged in an upward direction. The upward movement of rotor 400 during the power stroke causes the locking of clutches 221 and 412 so that torque is applied to inner shaft 56 upon which is mounted drive gear 73. The torque is then transmitted into driven gear 69 connected to output shaft 70. At the same time the firing in chamber 303 urges rotor 300 upwardly. Since clutch devices 112 and 312 disengage during the upward movement of outer shaft 41, the torque from rotor 300 is transmitted through the outer shaft to intermediate gear 72 and then through intermediate gear 71 to outer shaft 50. Thus the torque developed by rotor 300 is transmitted through the outer shaft 50 and then to inner shaft 56, as is the torque for rotor 400. In this way it may be seen that when torque is transmitted through one of the inner shafts through the intermediate gear adjacent thereto to the outward shaft, the other inner shaft is unloaded but is driven freely by the engagement of its drive gear with driven gear 69. Therefore the drive gears alternately transmit torque to the driven gear which rotates output shaft 70 in a constant direction. Output shaft 70 is supported in end cover 45 by ball bearing 74.

The valving and its driving arrangement is shown in FIG. 4. Chambers 101 and 201 are provided with intake ports 113 and 213, respectively. Intake valves 114 and 214 are disposed in valve chambers 115 and 215, respectively. In the closed position, the valves engage seats 116 and 216. Intake passages 105 and 205 extend from compression chamber 58 to valve chambers 115 and 215, respectively. Intake valve 114 is operated by push rod 117 which is engaged with rocker arm 118 pivotally mounted on shaft 119. The angular location of the intake ports with respect to the chambers is shown in FIG. 5A–D. Chamber 201 includes an arrangement similar to that of chamber 101. Intake port 213 leads to valve chamber 215 in which intake valve 214 is disposed. Intake valve 214 is adapted to close upon seat 216 thereby blocking intake passage 205 which leads to valve chamber 215. Valve 214 is operated by push rod 217 and rocker arm 218 which is mounted upon shaft 219.

As shown in FIG. 6 intake port 113 includes a plurality of spaced openings 113a extending across inner circular wall 108. Webs 113b which form the openings serve to support end strips 107 as rotor 100 passes the area of the intake port. The web arrangement is used at the intake ports in each of the chambers.

Chambers 101 and 201 are provided with exhaust ports 120 and 220. Valve chambers 121 and 221 are adjacent the ports and contain rotary exhaust valves 122 and 222. As shown in FIG. 4 exhaust passages 123 and 223 connect to valve chambers 121 and 221 and the passages are intersected by the extension of the exhaust valve. FIG. 9 shows exhaust valves 122 and 322 for chambers 101 and 301. The valves contain passages 122a and 322a which terminate at walls 122b and 322b. At one end of valve 122 there is provided surfaces 122c and 122d which are adapted to engage closing push rod 124 and opening push rod 125, respectively. In a similar manner rotary valve 322 includes exhaust passage 322a having wall 322b. Closing push rod 324 engages surface 322c while opening push rod 325 engages surface 322d. A similar arrangement is used in the remaining chambers. Thus chamber 201 has rotary valve 222 with closing push rod 224 and opening push rod 225. The angular location of the intake and exhaust port or chambers 101–104 inclusive, is shown in FIGS. 5A–5D, respectively. The angular location of the opening and closing push rods and the intake valve push rod are shown in FIGS. 7A–7D.

When rotary exhaust valve 122 is moved to its closed position by closing push rod 124, wall 122b of valve opening 122a extends across the end portion of exhaust passage 123 at the point of intersection with exhaust chamber 121 thereby closing the passage. In the closed position the spring loaded detent 126 engages pocket 127 and restrains the rotary valve from further movement. When opening push rod 125 rotates the valve to a position at which wall 122b permits flow to the exhaust passage, the rush of exhaust gas is capable of acting upon the rotary valve and urging it to the full open or exhaust position. In this way the valve is capable of opening in an extremely short period of time since the opening push rod need only to rotate the valve until the wall partially uncovers the exhaust passage after which the gas forces snap the valve to its full open position.

As shown in FIG. 3 cam unit 75 is attached to hollow outer shaft 41. Cam unit 75 includes exhaust cams 128 and 328 for operation of the push rods related to rotary exhaust valves 122 and 322, respectively. Cam unit 76 mounted upon hollow outer shaft 50 includes exhaust cams 228 and 428 for operation of rotary exhaust valves 222 and 422, respectively. The angular location of the exhaust cams with respect to the cam units is shown in FIGS. 8A–8D when the rotors are at the top position.

As shown in FIG. 4 cam unit 75 contains socket 77 in which is disposed pin cam 78 which is urged in an outward direction by spring 79. In a similar manner cam unit 76 contains socket 80 in which pin cam 81 is disposed and urged outwardly by spring 82. The location of the pin cams with respect to the exhaust cams is schematically shown in FIGS. 8A–8D. The pin cams by virtue of their spring restraint within the socket are adapted to be urged inwardly whenever the external surface of the pin cam forms an obtuse angle with the adjacent external surface of the push rod. On the contrary, when the surface of the pin cam adjacent to the push rod forms an acute angle with the adjacent surface of the push rod, there is no tendency for the pin cam to be urged inwardly with the result that the pin cam is capable of applying a moving force to the push rod.

In order to start the engine, it is necessary that the rotors be oscillated by an external power source until ignition occurs and causes the firing of the charges within the chambers of a pair of rotors. The cranking of the engine must continue until the engine can produce sufficient torque to drive itself. As shown in FIG. 3 outer shaft 50 is provided with starter friction wheel 83. To provide the oscillating drive necessary to operate the rotors during starting, starter wheel 83 can be driven by a starter drive 85 (FIG. 10). Thus starter wheel 83 is provided with starter drive 85 including friction wheel 85a, worm 85b and shock absorbing springs 85c driven by the shaft of motor 86.

In order to start the engine it is necessary to oscillate outer shaft 50 in order to move the rotors against the compression forces. With switch 534, closed motor 86 is energized through leads 88a and 88b and thereby rotates shaft 86a and pinion 87 in order to drive starter wheel 83 in a clockwise direction as viewed in FIG. 1. The rotation of the worm causes wheel 85a, which is threaded to the worm, to advance like a nut and frictionally engage wheel 83. The rotation of the outer shaft 50 in a clockwise direction causes rotors 200 and 400 to move downwardly in a clockwise direction. The clockwise motion of shaft 50 is transmitted through intermediate gears 71 and 72 with the result that outer shaft 41 is rotated in a counterclockwise direction as viewed in FIG. 1. In this way rotors 100 and 300 as well as rotors 200 and 400 are cranked downwardly from their uppermost position. During this movement rotors 100 and 200 pass through the power portion of their cycle of operation while rotors 300 and 400 pass through the exhaust portion and into the compression portion of their cycle. If firing takes place in chambers 103 and 203 as rotors 100 and 200 begin to move downwardly the rotors develop a driving torque and the resulting increase in velocity of the rotors causes an overrunning condition at drive unit 85 so that wheel 85a advances along worm 85b and disengages from starter wheel 83.

When the rotors have reached the bottommost portion of their cycle, starter motor 86 is reversed by being energized with the opposite polarity. Worm 85b and wheel 85a then drive starter wheel 83 and outer shaft 50 in a counterclockwise direction as viewed in FIG. 1. Rotors 100 and 200 then move upwardly through the exhaust portion and into the compression portion of their cycle while at the same time rotors 300 and 400 are moved through the power portion of their cycle. Similarly as during the operation of starter motor 86 in the opposite direction, the torque applied by the starter motor to outer shaft 50 is transmitted through intermediate gears 71 and 72 to shaft 41 and rotors 100 and 300. Upon combustion, rotors 300 and 400 are accelerated upwardly and under this condition drive 85 overruns and thereby disengages from the starter gear.

The alternately reversing operation of starter motor 86 is continued until the rotary engine reaches idle speed and can continue to operate under its own power. From the description of the operation of the starter motors, it can be seen that a starter motor reversing switch device is required to change the polarity of the power supplied to the starter motor in order that the rotors can be properly oscillated for starting. The starter switch arrangement is shown in FIGS. 10–13. As shown in FIG. 11, outer shaft 41 is relieved to provide ring portion 500 which extends through an arcuate distance of approximately 225° adjacent the end of the shaft. Extending into the interior portion of shaft 41 adjacent ring portion 500 is yoke 501 having lobe 501a. Yoke 501 can be mounted within a ball bearing or the like secured within the inside diameter of shaft 41. During the substantially 180° oscillatory motion of shaft 41, end portions 500a thereof alternately engage the opposite sides of lobe 501a and move it in a rocking manner.

The starter switch arrangement further includes housing 502 which is fixedly supported with respect to block 40 of the engine by arm 503. Housing 502 is provided with stub shaft 504 which extends along the center line of shaft 41. Starter switch rotor 505 is rotatably mounted with respect to stub shaft 504 and adjacent to yoke 501. Studs 506 extending from yoke 501 are positioned adjacent to each of the opposite sides of arms 505a of the starter switch rotor. The starter switch rotor further includes cam 505b having elevated portion 505c with substantially flat portions 505d adjacent to each side thereof. Flat spring 507 extends adjacent to cam 505b and is secured at each end to housing 502 by anchors 508. Housing 502 is further provided with terminals 509 and 510 which are adjacent to the circular path of travel of arms 505a of the starter switch rotor and are adapted to be connected to power supply or battery 520. Conductors 505e and 505f extending from contacts 505g and 505h at the opposite ends of arms 505a transmit current through contacts 530 and 531 to terminals 532 and 533 and then to leads 88a and 88b of motor 86. Terminals 509 and 510 can include ball contacts 509a and 510a, respectively which are urged to extend beyond the end portions of sleeves 511 and 512 by the force of springs 513 and 514.

As shown in FIG. 11, upon movement of ring portion 500 in a counterclockwise direction, end portion 500a engages arm 505a and moves it in a counterclockwise direction away from contacts 509. During this movement elevated portion 505c of the cam slides along the surface of flat spring 507 and lowers it. Cam 505b then snaps in a counterclockwise direction until its flat portion 505d is positioned adjacent to the spring. This action results in the engagement of contacts 505g and 505h with terminals 510 so that an electrical circuit is now provided to starter motor 86 which begins to crank the engine in the opposite direction.

In addition to the timing of the operation of the starter motors, it is necessary to time the ignition pulses to ignition devices 104–404 in order that ignition occurs whenever a pair of rotors are about to enter upon the power portion of their operating cycle. The ignition timing device which is shown in FIGS. 11 and 12 includes fixed contact point 513 mounted upon support 513a within housing 502. Movable contact point 515 is attached to spring 516 which is supported by base 517 within housing 502. Spring 516 biases movable contact 515 toward the cam.

Lead 518 connects fixed contact 513 to primary winding 519a of coil 519 (FIG. 11). The primary winding is connected through ignition switch 533 to power source 520a and then to ground. Whenever the contact points are closed, the circuit is completed through spring 516, lead 521 which is connected to grounded terminal 522. Spring 516 is urged upwardly by engagement with elevated portion 505c of cam 505b. Whenever the engagement of ring portion 500 occurs with arms 505a, cam 505b is subsequently moved with a snap action as spring 516 leaves the point of engagement with elevated portion 505c and enters upon flat portion 505d of the cam. Since spring 516 is biased toward the cam, the movement of the spring onto the flat portion of the cam results in the rapid opening of the contact points. The quick interruption of the primary current through coil 519 induces a high voltage in secondary winding 519b which is connected by lead 523 to terminal 524 on housing 502. Lead 524a continues the high tension circuit to rotor 525 which is rotated in conjunction with starter switch rotor 505. The high tension circuit continues through rotor contacts 525a to one of distributor contacts 526a and 526b and then to leads 527a and 527b, respectively. The high tension circuit is completed by terminals 528a and 528b to which are connected leads 529 and 530, respectively, for ignition devices 104–204.

When cam 505b is moved in a clockwise direction to its righthand position (FIG. 11) the ignition contacts are opened and the high voltage energy is transmitted by the distributor rotor and through lead 529 to ignition devices 104 and 204. In this way, rotors 100 and 200 when in their upward limiting position, are subjected to the expansion forces of the burning gas mixture following ignition. Upon the firing of the chambers at rotors 100 and 200, shaft 41 rotates in a counterclockwise direction as viewed in FIG. 11 with the result that cam 505b is urged in a counterclockwise direction. When the ignition points are opened as spring 516 enters onto the flat portion 505d of the cam, high voltage energy is transmitted through the distributor rotor to lead 530 which is connected to ignition devices 304 and 404. At this point rotors 300 and 400 are adjacent the downward limits of their oscillatory travel and the combustion of the gas mixture accompanying ignition at this location urges the rotors upwardly.

*Operation*

The ignition system is activated by the closing of ignition switch 533. When the engine is ready to be started, starter switch 534 is closed to connect power source 520 to leads 88a and 88b of starter motor 86. Starter switch rotor 505 in response to the position of the rotors causes the completion of an electrical circuit of a given polarity to the starting motor to initiate the starting cycle. If rotor 100 is at its uppermost position, ring portion 500 of outer shaft 41 urges lobe 501a of yoke 501 in a clockwise direction as seen in FIG. 11. In turn studs 506 urge starter switch rotor 505 in a clockwise direction with the result that contacts 505g and 505h engage terminals 509 and cause starter motor 86 to be energized.

By means of the engagement of wheel 85a of drive 85 connected to starter motor 86, starter wheel 83 is rotated in a clockwise direction, thereby rotating shaft 50 and rotors 200 and 400 in a clockwise direction as seen in FIG. 1. In this way rotors 100 and 200 are moved into the power portion of their cycle. The clockwise movement of outer shaft 50 is transmitted by intermediate gear 71 to intermediate gear 72 causing outer shaft 41 to rotate in a counterclockwise direction. Consequently rotors 100 and 200 move simultaneously with rotors 300 and 400 from their upermost position. At this point, similarly as with respect to rotor 200, rotor 100 enters the power portion of its cycle.

When rotors 300 and 400 move downwardly, they initially enter upon the exhaust portion of their cycle followed by the charging and compression portions. When the rotors are driven to the downward position by starter 86, the counterclockwise movement of ring portion 500, as seen in FIG. 11, engages lobes 501a and urges it in a counterclockwise direction. The motion of yoke 501 is transmitted through studs 506 to starter switch rotor 505 which causes cam 505b to move in a counterclockwise direction. By virtue of flat spring 507 in engagement with elevated portion 505c of the cam, the starter switch rotor snaps in the counterclockwise direction (FIG. 11) and engages contacts 505g and 505h with terminals 510 which complete the electrical circuit from power source 520 to starter motor 86 which reversed polarity. In this way the operation of starter motor 86 is reversed and drives starter wheel 83 in a counterclockwise direction and thereby outer shaft 50 in a counterclockwise direction as seen in FIG. 1.

Accompanying the counterclockwise snap action of starter switch rotor 505, spring 516 enters upon flat section 505d of the cam and under the biasing force of spring 516, contact points 513 and 515 open. At this time distributor rotor 525 has its contacts 525a adjacent contact 526b which leads to ignition devices 304 and 404. The opening of the contact points abruptly terminates the primary current through coil 519 with the result that a high tension pulse is transmitted by way of the distributor rotor to ignition devices 304 and 404. The ignition of the charge in firing chambers 303 and 403 then urges rotors 300 and 400 in the upward direction.

If ignition has successfully taken place in firing chambers 303 and 403, rotors 300 and 400 are accelerated and result in the overrunning of the drive unit driven by starter motor 86. While rotors 300 and 400 move upwardly under the power impulse, rotors 100 and 200 pass through their exhaust portion of the operating cycle and enter into the compression portion. Thus when rotors 300 and 400 reach the upward position, rotors 100 and 200 do likewise and are ready for the next power cycle. At this point the clockwise motion of ring portion 500, as shown in FIG. 11, causes starter switch rotor 505 to be operated, thereby causing the cranking of starter motor 86 to be reversed again. At the same time the interaction between cam 505b and spring 516 causes another high tension ignition pulse to be delivered by the distributor rotor to lead 529 connected to the ignition devices 104 and 204 of the chambers containing rotors 100 and 200. Thus the point is reached at which a power cycle can be commenced at rotors 100 and 200. During starting the drive units overrun whenever a successful firing causes the rotors to accelerate. Once a steady running position has been reached the starting cycle is terminated by opening starter switch 534.

Upon the occurrence of combustion in firing chamber 103, rotor 100 moves in a counterclockwise direction as seen in FIG. 1. Exhaust cam unit 75 being attached to outer shaft 41 rotates with rotor 100. As rotor 100 moves downwardly the engagement of cam lobe 128 with closing push rod 124 has no effect upon rotary valve 122 since the valve is already in the closed position. Toward the end of the 180° travel of rotor 100, cam lobe 128 engages opening push rod 125 and initiates the rotation of rotary valve 122 in the opening direction. Due to the extensive arcuate travel of the rotor during the power stroke, a high degree of expansion of the burning gases takes place so that a major fraction of the energy is expended in work upon rotor 100.

The motion of opening push rod 125 is transmitted to surface 122c of the rotary valve and results in the valve being rotated in the opening direction. As soon as wall 122b of the valve moves into the exhaust passage, the exhaust gas can pass through exhaust port 120 and outwardly through the passage. The force of the exhaust gas flow, once the valve is partially opened, is capable of further rotating the valve with a rapid circular motion to its full open position so that it is unnecessary for the opening push rod to directly actuate the valve throughout its entire path of travel. This arrangement insures that the exhaust valve is fully opened by the time the rotor has reached its downward extreme position.

During the downward movement of rotor 100, rotor 200 passes through the same cycle of operation. Thus cam lobe 228 of cam unit 76 engages closing push rod 224 without any effect upon rotary valve 222 since the valve is at this time closed. Near the end of the 180° downward movement of rotor 200, cam lobe 238 engages opening push rod 225 which contacts surface 222c causing the rotary valve to begin its opening motion. The rush of exhaust gas through port 220 in the direction of passage 223 completes the opening of the rotary valve in a rapid manner.

During the previous cycle of operation when rotors 100 and 200 were moving upwardly, the suction resulting from the upward movement of the rotors induces a flow of the fuel air mixture past mixture supply valve 59 into compression chamber 58 and then into chambers 101 and 201. Consequently during the downward power stroke of rotors 100 and 200 the fuel air mixture in the chambers is compressed into compression chamber 58 by the time the rotors have reached their downward position. Thus the fuel air mixture in compression chamber 58 as well as that forced into intake passages 105 and 205 which extend to intake ports 113 and 213, respectively, are subjected to an elevated pressure. At the end of the downward stroke of the rotors, ignition takes place in firing chambers 303 and 403 and the rotors are then driven in an upward direction.

During the previous downward movement of rotors 100 and 200, pin cam 78 intersects intake push rod 117 with the longitudinal axes of the pin cam and the push rod at an angle such that the pin cam is urged inwardly into socket 77. As rotor 100 approaches the bottommost portion of its travel, pin cam 78 disengages from intake push rod 177 and is urged outwardly by spring 79. Upon the reverse movement of rotor 100 during the firing at rotors 300 and 400, pin cam 78 engages push rod 117 at an angle which results in the pin cam urging the push rod in an outward direction. The motion of the push rod is transmitted through rocker arm 118 which opens intake valve 114 thereby permitting an inrush of the compressed fuel air mixture from passage 105 through intake valve chamber 115 and intake port 113 into chamber 101. During the movement of the pin cam into engagement with push rod 117, cam lobe 128 engages closing push rod 124 which acts upon surface 122d of the rotary valve and moves it in the closing direction. Thus by closing the exhaust valve as the intake valve opens, a loss of the fuel air mixture is prevented. Movement of the exhaust valve is continued until its final closed position is reached at which point detent 126 secures the valve from further motion.

The charge admitted above the rotor is then compressed as the rotor moves upwardly toward firing chamber 103. At the same time due to the closure of the intake valve, the upward sweep of the rotor induces a suction condition in compression chamber 58 which urges the mixture supply valve to open and thereby admit a new fuel air charge. As rotors 100 and 200 approach the top position and compress the charges into the firing chambers, rotors 300 and 400 approach the end portion of their power stroke. Thus rotors 100 and 200 are made ready to reverse direction and move downwardly during their power stroke. Pin cam 81 operates intake push rod 217 in a manner similar to that described with respect to chamber 101. In addition cam lobe 228 operates closing push rod 224 and opening push rod 225 similarly as the case of the push rods of chamber 101.

The sequence of events for the valving of chambers 301 and 401 is similar to that described with respect to chambers 101 and 201 with the basic difference being that firing takes place as the rotors move upwardly and exhaust and compression take place as the rotors move downwardly.

During the firing at rotor 100, overrunning clutch devices 112 and 312 engage outer shaft 41 to inner shaft 42 and thereby transmit torque through drive gear 68 and driven gear 69 to output shaft 70. At the same time rotor 200 which is experiencing a power stroke transmits torque to outer shaft 50 to which it is attached but not to inner shaft 56 since during the downward motion of rotors 200 and 400, clutching devices 212 and 412 are disengaged. The torque transmtited to outer shaft 50 is coupled through intermediate gear 71, into intermediate gear 72 and thereby to shaft 41. Thus the torque resulting from the power stroke at rotor 200 is added to that of rotor 100 and the sum total is transmitted by inner shaft 42 to the output shaft 70.

Upon the firing of cylinders 300 and 400 they are urged in an upward direction at which time rotor 400 causes overrunning clutch devices 212 and 412 to engage inner shaft 56 and drive it in a counterclockwise direction. The motion of shaft 56 is transmitted through drive gear 73 and driven gear 69 to output shaft 70. The power impulse at rotor 300 in an upward direction is not coupled to inner shaft 42 since in the upward direction overrunning clutching devices 112 and 312 are disengaged. Therefore the torque resulting from the power impulse rotates shaft 41 which is connected to shaft 50 by means of intermediate gears 72 and 71. In this way the torque at rotor 300 is added to that applied by rotor 400 to inner shaft 56 and the total torque is transmitted to the output shaft.

Thus it can be seen that upon each oscillation of the rotors, a pair of the rotors receives a power impulse that extends over the major portion of their substantially 180° path of travel. In addition, for every oscillation of the engine two of the rotors of the four apply a power impulse to the output shaft. This mode of operation taken with practically the complete expansion of the burning gases enables the engine to operate in an efficient manner and at the same time to have a high power output as related to the displacement of the engine and the speed of oscillation.

It can be seen from the above description that the present invention provides a fluid device which has an oscillating motion of operation and which is adapted to be employed as an internal combustion engine. Although various embodiments of the invention have been shown and described herein, it is understood that certain changes and additions within the scope of the appended claims may be made by those skilled in the art without departing from the scope and spirit of the invention.

I claim:

1. A fluid device comprising a pair of adjacent arcuate chambers extending in substantially opposite directions with respect to one another, each of said pair of chambers having an exhaust opening; a vaned rotor mounted for oscillating within each of said chambers; means for synchronizing the rotors to oscillate in opposite angular directions with respect to one another; and means for controlling the flow of fluid into and out of said chambers in timed relationship with the oscillation of said rotors, said flow controlling means including a rotary valve member for each of said pair of chambers, said rotary valve member having a passage extending therethrough and being disposed adjacent said exhaust opening, and means operated in timed relationship with the oscillation of said rotor for rotating said valve member from one position where said valve member closes said exhaust opening to another position where said passage partially overlies said exhaust opening, said valve member being responsive to the flow of fluid from said chamber after the expansion of said fluid following the combustion of said fuel, said flow engaging said passage and rotating said valve member to said other position.

2. A fluid device comprising a plurality of pairs of arcuate chambers disposed adjacent one another, the chambers of each of said pairs extending in substantially opposite directions, a plurality of vaned rotors, each of said rotors being mounted for oscillating within a different one of said chambers, means for interconnecting one rotor from each of said pairs of chambers, additional means for interconnecting the other rotor of each of said pairs of chambers, means for controlling the flow of fluid into and out of each of said chambers in timed relationship with the oscillation of said rotor therein, a rotary shaft member, and means for alternately coupling the rotors of said interconnecting means and the rotors of said additional interconnecting means to said rotary shaft member.

3. A fluid device comprising a plurality of pairs of arcuate chambers disposed adjacent one another, the chambers of each of said pairs extending in substantially opposite directions, a plurality of vaned rotors, each of said rotors being mounted for oscillating within a different one of said chambers, means for interconnecting one rotor from each of said pairs of chambers, additional means for interconnecting the other rotor of each of said pairs of chambers, means for synchronizing the rotors of said interconnecting means to oscillate in an angular direction opposite to that of the rotors of said additional interconnecting means, means for controlling the flow of fluid into and out of each of said chambers in timed relationship with the oscillation of said rotors therein, a rotary shaft member, and means for coupling the interconnected oscillating plurality of rotors to said rotary shaft member.

4. A fluid device comprising a plurality of pairs of arcuate chambers disposed adjacent one another, the chambers of each of said pairs extending in substantially opposite directions, a plurality of vaned rotors, each of said rotors being mounted for oscillating within a different one of said chambers, means for interconnecting one rotor from each of said pairs of chambers, additional means for interconnecting the other rotor of each of said pairs of chambers, means for synchronizing the rotors of said interconnecting means to oscillate in an angular direction opposite to that of the rotors of said additional interconnecting means, means for controlling the flow of fluid into and out of the chambers of one portion of said plurality in timed relationship with the oscillation of said rotors therein and beginning with a predetermined portion of the cycle of said oscillation, additional means for controlling the flow of fluid into and out of the chambers of the other portion of said puurality in timed relationship with the oscillation of said rotors therein and beginning with a portion of the cycle of said oscillation substantially opposite to said predetermined portion, a rotary shaft member, and means for coupling the interconnected oscillating plurality of rotors to said rotary shaft member.

5. An internal combustion device comprising a pair of adjacent arcuate chambers extending in substantially opposite directions with respect to one another, each of said pair of chambers having an exhaust opening; a vaned rotor mounted for oscillating within each of said chambers; means for synchronizing the rotors to oscillate in opposite angular directions with respect to one another; means for controlling the flow of fluid into and out of said chambers in timed relationship with the oscillation of said rotors, said flow controlling means including a rotary valve member for each of said pair of chambers, said rotary valve member having a passage extending therethrough and being disposed adjacent said exhaust opening, and means operated in timed relationship with the oscillation of said rotor for rotating said valve member from one position where said valve member closes said exhaust opening to another position where said passage partially overlies said exhaust opening, said valve member being responsive to the flow of fluid from said chamber after the expansion of said fluid following the combustion of said fuel, said flow engaging said passage and rotating said valve member to said other position; means for introducing fuel into said chamber in timed relationship with the oscillation of said rotor, and means for igniting said fuel in timed relationship with the oscillation of said rotor.

6. An internal combustion device comprising a plurality of pairs of arcuate chambers disposed adjacent one another, the chambers of each of said pairs extending in substantially opposite directions, a plurality of vaned rotors, each of said rotors being mounted for oscillating within a different one of said chambers, means for interconnecting one rotor from each of said pairs of chambers, additional means for interconnecting the other rotor of each of said pairs of chambers, means for controlling the flow of fluid into and out of each of said chambers in timed relationship with the oscillation of said rotor therein, a rotary shaft member, means for alternately coupling the rotors of said interconnecting means and the rotors of said additional interconnecting means to said rotary shaft member, means for introducing fuel into said chamber in timed relationship with the oscillation of said rotor, and means for igniting said fuel in timed relationship with the oscillation of said rotor.

7. An internal combustion device comprising a plurality of pairs of arcuate chambers disposed adjacent one another, the chambers of each of said pairs extending in substantially opposite directions, a plurality of vaned rotors, each of said rotors being mounted for oscillating within a different one of said chambers, means for interconnecting one rotor from each of said pairs of chambers, additional means for interconnecting the other rotor of each of said pairs of chambers, means for synchronizing the rotors of said interconnecting means to oscillate in an angular direction opposite to that of the rotors of said additional interconnecting means, means for controlling the flow of fluid into and out of each of said chambers in timed relationship with the oscillation of said rotors therein, a rotary shaft member, means for coupling the interconnected oscillating plurality of rotors to said rotary shaft member, means for introducing fuel into said chamber in timed relationship with the oscillation of said rotor, and means for igniting said fuel in timed relationship with the oscillation of said rotor.

8. An internal combustion device comprising a plurality of pairs of arcuate chambers disposed adjacent one another, the chambers of each of said pairs extending in substantially opposite directions, a plurality of vaned rotors, each of said rotors being mounted for oscillating within a different one of said chambers, means for interconnecting one rotor from each of said pairs of chambers, additional means for interconnecting the other rotor of each of said pairs of chambers, means for synchronizing the rotors of said interconnecting means to oscillate in an annular direction opposite to that of the rotors of said additional interconnecting means, means for controlling the flow of fluid into and out of the chambers of one portion of said plurality in timed relationship with the oscillation of said rotors therein and beginning with a predetermined portion of the cycle of said oscillation, additional means for controlling the flow of fluid into and out of the chambers of the other portion of said plurality in timed relationship with the oscillation of said rotors therein and beginning with a portion of the cycle of said oscillation substantially opposite to said predetermined portion, a rotary shaft member, means for coupling the interconnected oscillating plurality of rotors to said rotary shaft member, means for introducing fuel into said chamber in timed relationship with the oscillation of said rotor, and means for igniting said fuel in timed relationship with the oscillation of said rotor.

9. An internal combustion device comprising an arcuate chamber, said chamber having an exhaust opening; a vaned rotor mounted for oscillating within said chamber; means for coupling said oscillating rotor to a rotary member; means for admitting a flow of fluid into said chamber, said rotor being adapted to compress said fluid adjacent one side thereof during a portion of the cycle of operation thereof; means extending without said chamber for transferring said fluid after being compressed to said chamber adjacent the other side of said rotor, said rotor being adapted to further compress said fluid adjacent said other side during another portion of said cycle of operation thereof; means for introducing fuel into said chamber in timed relationship with the oscillation of said rotor; means for igniting said fuel in said further compressed fluid; and means for exhausting fluid from said chamber after the expansion of said fluid following the ignition of said fuel, said fluid exhausting means including a rotary valve member for said chamber, said rotary valve member having a passage extending therethrough and being disposed adjacent said exhaust opening, and means operated in timed relationship with the oscillation of said rotor for rotating said valve member from one position where said valve member closes said exhaust opening to another position where said passage partially overlies said exhaust opening, said valve member being responsive to the flow of fluid from said chamber after the expansion of said fluid following the combustion of said fuel, said flow engaging said passage and rotating said valve member to said other position.

10. An internal combustion device comprising an arcuate chamber, said chamber having an exhaust opening; a vaned rotor mounted for oscillating within said chamber; means for coupling said oscillating rotor to a rotary member; means for admitting a flow of fluid into said chamber in response to suction therein, said rotor being adapted to compress said fluid adjacent one side thereof during a portion of the cycle of operation thereof; means extending without said chamber for transferring said fluid after being compressed to said chamber adjacent the other side of said rotor, said rotor being adapted to further compress said fluid adjacent said other side during another portion of said cycle of operation thereof; means for introducing fuel into said chamber in timed relationship with the oscillation of said rotor; means for igniting said fuel in said further compressed fluid; and means for exhausting fluid from said chamber after the expansion of said fluid following the ignition of said fuel, said fluid exhausting means including a rotary valve member for said chamber, said rotary valve member having a passage extending therethrough and being disposed adjacent said exhaust opening, and means operated in timed relationship with the oscillation of said rotor for rotating said valve member from one position where said valve member closes said exhaust opening to another position where said passage partially overlies said exhaust opening, said valve member being responsive to the flow of fluid from said chamber after the expansion of said fluid following the combustion of said fuel, said flow engaging said passage and rotating said valve member to said other position.

11. An internal combustion device comprising an arcuate chamber having an exhaust opening, a vaned rotor mounted for oscillating within said chamber; means for coupling said oscillating rotor to a rotary member, means for admitting a flow of fluid into said chamber, said rotor being adapted to compress said fluid adjacent one side thereof during a portion of the cycle of operation thereof, additional means extending without said chamber, for transferring said fluid after being compressed to said chamber adjacent the other side of said rotor, said rotor being adapted to further compress said fluid adjacent said other side during another portion of said cycle of operation thereof, means for introducing fuel into said chamber in timed relationship with the oscillation of said rotor, means for igniting said fuel in said further compressed fluid, and rotary valve means for exhausting fluid from said chamber after the expansion of said fluid following the ignition of said fuel, said rotary valve means includnig a rotary valve member for each of said pair of chambers, said rotary valve member having a passage extending therethrough and being disposed adjacent said exhaust opening, and cam means operated in timed relationship with the oscillation of said rotor for rotating said valve member from one position where said valve member closes said exhaust opening to another position where said passage partially overlies said exhaust opening, said valve member being responsive to the flow of fluid from said chamber after the expansion of said fluid following the combustion of said fuel, said flow engaging said passage and rotating said valve member to said other position.

12. An internal combustion device comprising an arcuate chamber having an exhaust opening, a vaned rotor mounted for oscillating within said chamber, means for coupling said oscillating rotor to a rotary member, means for admitting a flow of fluid into said chamber, said rotor being adapted to compress said fluid adjacent one side thereof during a portion of the cycle of operation thereof, additional means extending without said chamber for transferring said fluid after being compressed to said chamber adjacent the other side of said rotor, said rotor being adapted to further compress said fluid adjacent said other side during another portion of said cycle of operation thereof, means for introducing fuel into said chamber in timed relationship with the oscillation of said rotor, means for igniting said fuel in said further compressed fluid, a rotary valve member having a passage extending therethrough, said rotary member being disposed adjacent said exhaust opening, and cam means operated in timed relationship with the oscillation of said rotor for rotating said valve member from one position where said valve member closes said exhaust opening to another position where said passage overlies said exhaust opening, whereby fluid is exhausted from said chamber after the expansion of said fluid following the ignition of said fuel.

13. An internal combustion device comprising an arcuate chamber having an exhaust opening, a vaned rotor mounted for oscillating within said chamber, means for coupling said oscillating rotor to a rotary member, means for admitting a flow of fluid into said chamber, said rotor being adapted to compress said fluid adjacent one side thereof during a portion of the cycle of operation thereof, means for transferring said fluid after being compressed to said chamber adjacent the other side of said rotor, said rotor being adapted to further compress said fluid adjacent said other side during another portion of said cycle of operation thereof, means for introducing fuel into said chamber in timed relationship with the oscillation of said rotor, means for igniting said fuel in said further compressed fluid, a rotary valve member having a passage extending therethrough, said rotary valve member being disposed adjacent said exhaust opening, and means operated in timed relationship with the oscillation of said rotor for rotating said valve member from one position when said valve member closes said exhaust opening to another position where said passage partially overlies said exhaust opening, the flow of fluid from said chamber after the expansion of said fluid following the combustion of said fuel engaging said passage and rotating said valve member to said other position.

14. An internal combustion device comprising an arcuate chamber, a vaned rotor mounted for oscillating within said chamber, means for coupling said oscillating rotor to a rotary member, means for admitting a flow of fluid into said chamber, said rotor being adapted to compress said fluid adjacent one side thereof during a portion of the cycle of operation thereof, valve means for admitting said fluid after being compressed to said chamber adjacent the other side of said rotor, said rotor being adapted to further compress said fluid adjacent said other side during another portion of said cycle of operation thereof, means for introducing fuel into said chamber in timed relationship with the oscillation of said rotor, means for igniting said fuel in said further compressed fluid, valve means for exhausting fluid from said chamber after the expansion of said fluid following the ignition of said fuel, and cam means coupled to said rotor for actuating said admitting valve means and said exhausting valve means.

15. A rotary valve device comprising a freely rotatable body member extending across an aperture adapted to receive a flow of fluid, said body member having an opening therein, means for actuating said body member in rotation from one position when said body member closes said aperture to another position when said opening partially overlies said aperture, the flow of said fluid through said opening partially overlying said aperture being adapted to urge said freely rotatable body member to a position where said opening fully overlies said aperture.

16. An internal combustion device comprising a plurality of pairs of arcuate chambers disposed adjacent one another, the chambers of each of said pairs extending in substantially opposite directions and having an exhaust opening, a plurality of vaned rotors, each of said rotors being mounted for oscillating within a different one of said chambers, means for interconnecting one rotor from each of said pairs of chambers, additional means for interconnecting the other rotor of each of said pairs of chambers, means for synchronizing the rotors of said interconnecting means to oscillate in an angular direction opposite to that of the rotors of said additional interconnecting means, means for admitting a flow of fluid alternately into the chambers of different portions of said plurality of pairs, the rotors in said portions being adapted to compress said fluid adjacent one side thereof during a portion of the cycle of operation thereof, means for transferring said fluid after being compressed alternately into the chambers of different portions of said plurality of pairs adjacent the other side of said rotors, said rotors being adapted to further compress said fluid adjacent said other side during another portion of said cycle of operation thereof, means for introducing fuel alternately into the chambers of different portions of said plurality of pairs in timed relationship with the oscillation of said rotors, means for igniting said fuel in said further compressed fluid, a rotary valve member having a passage extending therethrough being disposed adjacent each of said exhaust openings, and means operated in timed relationship with the oscillation of said rotors for alternately rotating said valve members of said different portions of said pairs from one position when said valve members close said exhaust openings to another position when said passages partially overlie said exhaust openings, the flow of fluid from said chambers after the expansion of said fluid following the combustion of said fuel engaging said passages and rotating said valve member to said other position.

17. A fluid device comprising a pair of adjacent arcuate chambers extending in substantially opposite directions with respect to one another, each of said pair of chambers having an exhaust opening; a vaned rotor mounted for oscillating within each of said chambers; means for synchronizing said rotors to oscillate in opposite angular directions with respect to one another, the angle of each of said rotors with respect to a line extending through their axes of oscillation being equal to the other; and means for controlling the flow of fluid into and out of said chambers in timed relationship with the oscillation of said rotors, said flow controlling means including a rotary valve member for each of said pair of chambers, said rotary valve member having a passage extending therethrough and being disposed adjacent said exhaust opening, and means operated in timed relationship with the oscillation of said rotor for rotating said valve member from one position where said valve member closes said exhaust opening to another position where said passage partially overlies said exhaust opening, said valve member being responsive to the flow of fluid from said chamber after the expansion of said fluid following the combustion of said fuel, said flow engaging said passage and rotating said valve member to said other position.

18. An internal combustion device comprising a pair of adjacent arcuate chambers extending in substantially opposite directions with respect to one another, each of said pair of chambers having an exhaust opening; a vaned rotor mounted for oscillating within each of said chambers; means for synchronizing the rotors to oscillate in opposite angular directions with respect to one another, the angle of each of said rotors with respect to a line extending through their axes of oscillation being equal to the other; means for controlling the flow of fluid into and out of said chambers in timed relationship with the oscillation of said rotors, said flow controlling means including a rotary valve member for each of said pair of chambers, said rotary valve member having a passage extending therethrough and being disposed adjacent said exhaust opening, and means operated in timed relationship with the oscillation of said rotor for rotating said valve member from one position where said valve member closes said exhaust opening to another position where said passage partially overlies said exhaust opening, said valve member being responsive to the flow of fluid from said chamber after the expansion of said fluid following the combustion of said fuel, said flow engaging said passage and rotating said valve member to said other position; means for introducing fuel into said chambers in timed relationship with the oscillation of said rotor; and means for igniting said fuel in timed relationship with the oscillation of said rotors.

19. An internal combustion device comprising a plurality of pairs of arcuate chambers disposed adjacent one another, the chambers of each of said pairs extending in substantially opposite directions and having an exhaust opening, a plurality of vaned rotors, each of said rotors being mounted for oscillating within a different one of said chambers, means for interconnecting one rotor from each of said pairs of chambers, additional means for interconnecting the other rotor of each of said pairs of chambers, means for gearing the rotors of said interconnecting means to oscillate in the angular direction opposite to that of the rotors of said additional interconnecting means, an output shaft, means responsive to oscillation in one direction for coupling said interconnecting means to said shaft, means responsive to oscillation in the other direction for coupling said additional interconnecting means to said shaft, means for admitting a flow of fluid alternately into the chambers of different portions of said plurality of pairs, the rotors in said portions being adapted to compress said fluid adjacent one side thereof during a portion of the cycle of operation thereof, additional means for admitting said fluid after being compressed alternately into the chambers of different portions of said plurality of pairs adjacent the other side of said rotors, said rotors being adapted to further compress said fluid adjacent other side during another portion of said cycle of operation thereof, means for introducing fuel alternately into the chambers of different portions of said plurality of pairs in timed relationship with the oscillation of said rotors, means for igniting said fuel in said further compressed fluid, a rotary valve member having a passage extending therethrough being disposed adjacent each of said exhaust openings, and means operated in timed relationship with the oscillation of said rotors for alternately rotating said valve members of said different portions of said pairs from one position when said valve members close said exhaust openings to another position when said pasages partially overlie said exhaust openings, the flow of fluid from said chambers after the expansion of said fluid following the combustion of said fuel engaging said passages and rotating said valve member to said other position.

References Cited by the Examiner
UNITED STATES PATENTS

| | | | |
|---|---|---|---|
| 103,212 | 5/70 | Long | 123—18 |
| 1,189,834 | 7/16 | Kress | 123—18 |
| 1,200,681 | 10/16 | Woodward | 91—288 |
| 1,209,989 | 12/16 | Muilin | 123—18 |
| 1,473,199 | 11/23 | Peraza | 123—18 |
| 2,127,743 | 8/38 | Linthwaite | 123—18 |
| 2,599,274 | 6/52 | Murnin | 251—309 |
| 2,989,040 | 6/61 | Zalisko | 123—18 |
| 3,004,749 | 10/61 | North | 251—309 |

FOREIGN PATENTS

| | | |
|---|---|---|
| 1,241,862 | 8/60 | France. |
| 703,466 | 3/41 | Germany. |

RICHARD B. WILKINSON, *Primary Examiner.*

KARL J. ALBRECHT, FRED E. ENGELTHALER,
*Examiners.*

UNITED STATES PATENT OFFICE
CERTIFICATE OF CORRECTION

Patent No. 3,181,513 May 4, 1965

Gerald H. Young

It is hereby certified that error appears in the above numbered patent requiring correction and that the said Letters Patent should read as corrected below.

Column 11, line 23, for "lobe 288" read -- lobe 228 --; line 50, for "rod 177" read -- rod 117 --; column 14, line 64, for "annular" read -- angular --; column 16, line 39, after "means" insert -- coupled to said rotor and --.

Signed and sealed this 14th day of September 1965.

(SEAL)
Attest:

ERNEST W. SWIDER
Attesting Officer

EDWARD J. BRENNER
Commissioner of Patents